US012671645B2

(12) United States Patent
Hyeontaek et al.

(10) Patent No.: US 12,671,645 B2
(45) Date of Patent: Jun. 30, 2026

(54) OPTIMAL AP CONNECTION METHOD AND SYSTEM USING REINFORCEMENT LEARNING TO IMPROVE ENERGY EFFICIENCY AND LATENCY OF IoT DEVICES

(71) Applicant: Korea Advanced Institute of Science and Technology, Daejeon (KR)

(72) Inventors: Oh Hyeontaek, Daejeon (KR); Lee Seung Jin, Daejeon (KR); Park Jaeeun, Daejeon (KR); Choi Hyungwoo, Daejeon (KR); Lee Chanhyung, Daejeon (KR); Choi JunKyun, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 261 days.

(21) Appl. No.: 18/435,969

(22) Filed: Feb. 7, 2024

(65) Prior Publication Data

US 2024/0422089 A1      Dec. 19, 2024

(30) Foreign Application Priority Data

Jun. 13, 2023      (KR) ........................ 10-2023-0075830

(51) Int. Cl.
*H04L 12/26*          (2006.01)
*H04L 41/16*          (2022.01)
(Continued)

(52) U.S. Cl.
CPC .............. *H04L 43/10* (2013.01); *H04L 41/16* (2013.01); *G16Y 40/10* (2020.01); *H04W 88/08* (2013.01)

(58) Field of Classification Search
CPC ......... H04L 43/10; H04L 41/16; G16Y 40/10; H04W 88/08; H04W 52/386; H04W 4/70;
(Continued)

(56) References Cited

U.S. PATENT DOCUMENTS

2006/0075131 A1* 4/2006 Douglas ................ H04W 64/00
                                                            709/230
2023/0179261 A1* 6/2023 Newman ............... H04W 16/28
                                                            455/522
2023/0379128 A1* 11/2023 Wang .................. H04W 52/243

FOREIGN PATENT DOCUMENTS

EP          4402916 B1 * 5/2025 ........... H04W 28/06
KR      101741495 B1    6/2017
(Continued)

OTHER PUBLICATIONS

D. Chen et al., "Coexistence and Interference Mitigation for WPANs and WLANs From Traditional Approaches to Deep Learning: A Review," in IEEE Sensors Journal, vol. 21, No. 22, pp. 25561-25589, 15 Nov. 15, 2021. (Year: 2021).*

*Primary Examiner* — Thai Dinh Hoang
(74) *Attorney, Agent, or Firm* — Lee & Hayes, P.C.

(57)          ABSTRACT

Disclosed is an optimal AP connection method including transmitting, by an IoT device, a probe request message to a plurality of iAPs; transmitting, by each of the plurality of iAPs that receives the probe request message, the probe request message to an iAP controller and transmitting local information to each iAP to the iAP controller; performing, by the iAP controller, reinforcement learning for IoT device using global information that is updated from the local information; selecting, by the iAP controller, an optimal iAP based on RLreinforcement learning and transmitting recommended Tx power value information on the IoT device and a probe response message to the selected corresponding iAP; and transmitting, by the corresponding iAP that receives its (Continued)

selection as the optimal iAP in response to the probe request from the iAP controller, the probe response message and the recommended Tx power value information to the IoT device.

20 Claims, 14 Drawing Sheets

(51) Int. Cl.
*H04L 43/10* (2022.01)
*G16Y 40/10* (2020.01)
*H04W 88/08* (2009.01)

(58) Field of Classification Search
CPC . H04W 48/20; H04W 52/225; H04W 52/245; H04W 52/283; H04W 52/325; H04W 84/12; Y02D 30/70; G01S 5/02521
See application file for complete search history.

(56) References Cited

FOREIGN PATENT DOCUMENTS

| | | | | |
|---|---|---|---|---|
| WO | WO-2012095922 A1 * | 7/2012 | .......... | G01S 5/0205 |
| WO | WO-2013012263 A1 * | 1/2013 | .......... | H04W 76/28 |
| WO | WO-2017030342 A1 * | 2/2017 | .............. | H04L 5/00 |

* cited by examiner

FIG. 3

Case 1.

$(AP_1 : AP_2 : AP_3 = 1:1:1)$

Case 2.
($AP_1$ : $AP_2$ : $AP_3$ = 1:9:9)

Case 3.
$(AP_1 : AP_2 : AP_3 = 1:10:3)$

Case 1.
(AP$_1$ : AP$_2$ : AP$_3$ = 1:1:1)

Case 2.
$(AP_1 : AP_2 : AP_3 = 1:9:9)$

Case 3.
$(AP_1 : AP_2 : AP_3 = 1:10:3)$

OPTIMAL AP CONNECTION METHOD AND SYSTEM USING REINFORCEMENT LEARNING TO IMPROVE ENERGY EFFICIENCY AND LATENCY OF IoT DEVICES

CROSS-REFERENCE TO RELATED APPLICATION(S)

This application claims the priority benefit of Korean Patent Application No. 10-2023-0075830, filed on Jun. 13, 2023, in the Korean Intellectual Property Office, the disclosure of which is incorporated herein by reference.

BACKGROUND

1. Field of the Invention

The following example embodiments relate to an optimal access point (AP) connection method and system using reinforcement learning to improve energy efficiency and latency of Internet of things (IoT) devices.

2. Description of the Related Art

Recently, a ratio of Internet of things (IoT) through wireless fidelity (Wi-Fi) network connection is increasing and expected to exceed 40% by 2025. In particular, Wi-Fi technology for a healthcare IoT service having a share rate of 62% among the entire IoT services is greatly advancing.

As traffic in a Wi-Fi network increases, a cell covered by an access point (AP) of the network becomes smaller and more complex. As a result, mobile terminals (MTs) including IoT devices are present within a plurality of overlapping cells in the Wi-Fi network.

In this scenario, an MT typically connects to an AP with a strongest signal. Here, contention and packet collisions may occur during transmission due to concentration of devices on a specific AP. As a result, this repetitive transmission may disrupt energy efficiency and may increate-increase latency of a device. Also, a non-crowded AP is underutilized, which leads to degrading the overall network performance. Therefore, it is important to solve an issue of selecting an optimal AP in consideration of energy efficiency and latency of IoT devices in a multi-coverage Wi-Fi network environment.

There are two types of AP selection schemes in the Wi-Fi-network: distributed and centralized. In a traditional distributed scheme, an MT selects an AP based on received signal strength indication (RSSI) values between the MT and several available APs. However, biased AP connection may occur when many MTs desire to connect to a specific AP, which leads to load imbalance and poor quality of service (QoS) for MTs, including low throughput and latency performance. Some studies have attempted to solve this issue by using a combination of RSSI values and other parameters, but the distributed AP selection method has limitations in addressing load balancing due to limited information that MTs may obtain.

To solve such issues, a centralized AP selection method is proposed. The centralized approach for AP selection involves an AP selecting a most suitable AP based on factors, such as an RSSI value and achievable throughput. This method may give an assistance in reducing an unbalanced load issue and improving network performance. However, this approach does not consider uplink traffic and energy efficiency of IoT devices. When aiming to provide an IoT service, it is important to consider the uplink traffic and the energy efficiency of IoT devices since the performance (e.g., reliability, durability, etc.) highly depends on transmission activity of IoT devices. For example, in a healthcare IoT service, uplink traffic including sensed IoT data is frequently transmitted to a server and an amount of uplink traffic is much more significant than that of downlink traffic. Therefore, it is much more important to consider the uplink traffic rather than the downlink traffic. In addition, frequent replacement of an IoT device due to a limited battery capacity is a most significant challenge for implementing a good quality IoT service.

To solve the aforementioned issues, in the related art, proposed is an intelligent access point (iAP) system that increases energy efficiency of an IoT device when transmitting IoT data after an AP connection procedure. However, that procedures for initial AP selection and connection establishment also cause large energy consumption of the IoT device especially in a crowded network environment. Such real-time connection dynamics between an MT and an AP occur without knowledge of future connection. Since a selection of an AP is influenced by factors, such as uplink traffic of APs and distances between the APs and MTs connected thereto, the selection of an AP has a significant impact on network performance, specifically, in terms of energy efficiency.

However, relying solely on RSSI between an MT and an AP is not appropriate for achieving an optimal connection. Also, the number of possible cases for connections between MTs and APs grows exponentially according to an increase in the number of MTs, which leads to increasing a search space. To effectively explore this space while considering the influence of a current AP selection on future network performance, adoption of a reinforcement algorithm is essential.

As described above, due to a frequent battery replacement issue of an IoT device, improving expected lifespan of an IoT device through improving energy efficiency is required. In addition, in an indoor Wi-Fi network environment, such as a hospital, in many cases, IoT devices are present in a multiple AP coverage area. Therefore, there is a need to solve an issue of connecting an optimal AP among connectable APs.

Patent document includes Korean Patent Registration No. 10-1741495 (published on Jun. 15, 2017), titled Access Point, Device, and Method for Transceiving Packet Thereby.

SUMMARY

Example embodiments provide an optimal intelligent access point (iAP) connection method and system using reinforcement learning to improve energy efficiency and latency of a plurality of Internet of things (IoT) devices present within a multiple iAP coverage area. The example embodiments also propose an iAP controller for the optimal iAP connection method that may improve the energy efficiency and latency performance of the plurality of IoT devices and a reinforcement learning-based energy and latency reinforcement learning (EL-RL) model. Through such optimal iAP connection, the example embodiments are to innovatively increase expected lifespan of IoT devices and, at the same time, meet healthcare IoT service needs by improving the energy efficiency and latency performance of IoT devices.

According to an aspect, there is provided an optimal AP connection method using reinforcement learning to improve energy efficiency and latency of IoT devices, the method including transmitting, by an IoT device present within a multiple iAP coverage area, a probe request message for iAP connection to a plurality of iAPs; transmitting, by each of the plurality of iAPs that receives the probe request message, a received signal strength indication (RSSI) value and the probe request message to an iAP controller and periodically transmitting local information that includes the number of IoT devices connected to each iAP to the iAP controller; performing, by the iAP controller, reinforcement learning for IoT device energy efficiency and latency using global information that is updated from the local information obtained from the plurality of iAPs, the iAP controller including an energy and latency reinforcement learning (EL-RL) model, a location estimation model, and a recommended Tx power model to perform reinforcement learning; selecting, by the iAP controller, an optimal iAP based on reinforcement learning and transmitting recommended Tx power value information on the IoT device and a probe response message to the selected corresponding iAP; transmitting, by the corresponding iAP that receives its selection as the optimal iAP in response to the probe request from the iAP controller, the probe response message and the recommended Tx power value information to the IoT device; and transmitting, by the IoT device that receives the probe response message from the optimal iAP, IoT data at recommended Tx power through a connection process with the optimal iAP.

The performing, by the iAP controller, reinforcement learning for IoT device energy efficiency and latency using global information that is updated from the local information obtained from the plurality of iAPs may include numerically analyzing average energy consumption and average latency of the IoT devices according to the number of uplink transmission attempts of the IoT device and a successful transmission probability according to each transmission attempt through the EL-RL model of the iAP controller and performing reinforcement learning with a policy that minimizes an objective function configured with a weighted sum of the average energy consumption and the average latency of the IoT devices according to analysis results.

The performing, by the iAP controller, reinforcement learning for IoT device energy efficiency and latency using global information that is updated from the local information obtained from the plurality of iAPs may include transmitting a state to an EL-RL agent of the EL-RL model for optimal iAP selection in an environment of a simulator for performing reinforcement learning through the EL-RL model, and the state may be set based on an RSSI value between an IoT device to be connected and a candidate iAP and the number of IoT devices connected to the iAP, a reward may be calculated based on a distance from the connected IoT device according to an action that represents an iAP to be connected between candidate iAPs with the IoT device to be connected through numerical analysis of the simulator and the average energy consumption and the average latency, and minimizing the average energy consumption and the average latency of all connected IoT devices may be set as the objective function of the EL-RL model.

The performing, by the iAP controller, reinforcement learning for IoT device energy efficiency and latency using global information that is updated from the local information obtained from the plurality of iAPs may include performing pretraining using a fingerprinting method of estimating a location of the IoT device by comparing RSSI values input to a fingerprinting map including reference point values prestored in a database in a data collection of an offline process through the location estimation model of the iAP controller.

The performing, by the iAP controller, reinforcement learning for IoT device energy efficiency and latency using global information that is updated from the local information obtained from the plurality of iAPs may include collecting RSSI in real time through the IoT device and estimating a location of the IoT device using a model pretrained through the fingerprint method in an online process through the location estimation model of the iAP controller.

The performing, by the iAP controller, reinforcement learning for IoT device energy efficiency and latency using global information that is updated from the local information obtained from the plurality of iAPs may include calculating a distance from a candidate iAP according to an estimated location value of the IoT device estimated through the location estimation model of the iAP controller and then calculating a recommended Tx power value of the IoT device through the recommended Tx power model of the iAP controller.

The selecting, by the iAP controller, the optimal iAP based on reinforcement learning and the transmitting the recommended Tx power value information on the IoT device and the probe response message to the selected corresponding iAP may include selecting the optimal iAP through the EL-RL model of the iAP controller using an estimated location value of the IoT device estimated through the location estimation model of the iAP controller and a recommended Tx power value calculated through the recommended Tx power model of the iAP controller; and transmitting the recommended Tx power value information on the IoT device and the probe response message to the selected corresponding iAP to reduce energy consumption in an uplink transmission of the IoT device.

The transmitting, by the IoT device that receives the probe response message from the optimal iAP, the IoT data at recommended Tx power through the connection process with the optimal iAP may include numerically analyzing average energy consumption and average latency of the IoT devices using the number of transmission attempts including a retransmission of the IoT device due to a packet collision and a successful transmission probability according to each transmission attempt and transmitting the IoT data at the recommended Tx power according to analysis results, to reduce IoT device energy consumption due to the packet collision that occurs when the IoT device and another IoT device simultaneously transmit a packet during an uplink transmission of the IoT device.

The transmitting, by the IoT device that receives the probe response message from the optimal iAP, the IoT data at the recommended Tx power through the connection process with the optimal iAP may include calculating the average energy consumption of the IoT device with a sum of product of probability of all transmission attempts, probability of successful transmission without a packet collision, and an energy consumption value of each transmission attempt; and calculating the average latency of the IoT devices with a sum of product of probability of all transmission attempts, probability of successful transmission without a packet collision, and a latency value of each transmission attempt, and product of a packet collision probability and a time consumed for the packet collision.

According to another aspect, there is provided an optimal AP connection system using reinforcement learning to improve energy efficiency and latency of IoT devices, the system including a plurality of iAPs configured to receive a probe request message for iAP connection from an IoT device present within a multiple iAP coverage area, each of the plurality of iAPs that receives the probe request message transmitting an RSSI value and the probe request message to an iAP controller and periodically transmitting local information that includes the number of IoT devices connected to each iAP to the iAP controller; the iAP controller configured to perform reinforcement learning for IoT device energy efficiency and latency using global information that is updated from the local information obtained from the plurality of iAPs, to select an optimal iAP based on reinforcement learning, and to transmit recommended Tx power value information on the IoT device and a probe response message to the selected corresponding iAP, the iAP controller including an EL-RL model, a location estimation model, and a recommended Tx power model to perform reinforcement learning; and the IoT device configured to receive the probe response message and the recommended Tx power value information from the corresponding iAP that receives its selection as the optimal iAP in response to the probe request, and to transmit IoT data at recommended Tx power through a connection process with the optimal iAP.

According to still another aspect, there is provided a non-transitory computer-readable recording medium to perform an optimal AP connection method using reinforcement learning to improve energy efficiency and latency of IoT devices, the method including transmitting, by an IoT device present within a multiple iAP coverage area, a probe request message for iAP connection to a plurality of iAPs; transmitting, by each of the plurality of iAPs that receives the probe request message, an RSSI value and the probe request message to an iAP controller and periodically transmitting local information that includes the number of IoT devices connected to each iAP to the iAP controller; performing, by the iAP controller, reinforcement learning for IoT device energy efficiency and latency using global information that is updated from the local information obtained from the plurality of iAPs, the iAP controller including an EL-RL model, a location estimation model, and a recommended Tx power model to perform reinforcement learning; selecting, by the iAP controller, an optimal iAP based on reinforcement learning and transmitting recommended Tx power value information on the IoT device and the probe response message to the selected corresponding iAP; transmitting, by the corresponding iAP that receives its selection as the optimal iAP in response to the probe request from the iAP controller, the probe response message and the recommended Tx power value information to the IoT device; and transmitting, by the IoT device that receives the probe response message from the optimal iAP, IoT data at recommended Tx power through a connection process with the optimal iAP.

According to some example embodiments, it is possible to meet QoS of an IoT service and to improve energy efficiency of IoT devices through optimal iAP connection to improve energy efficiency and latency of IoT devices. Also, since it is possible to increase expected lifespan of an IoT device having limited energy resources (i.e., battery type) through an optimal iAP connection method, it is possible to give an innovative assistance in providing an IoT service (particularly, healthcare IoT service) that was difficult to practically use due to a frequent battery replacement issue. In addition, it is possible to provide various IoT services using a battery-typed miniature IoT device. Also, it is expected to bring great economic benefits to Wi-Fi equipment industry that may produce iAP, IoT device manufacturing industry, and healthcare IoT service platform industry.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 3 illustrates a configuration of an optimal iAP connection system using reinforcement learning to improve energy efficiency and latency of IoT devices according to an example embodiment;

DETAILED DESCRIPTION

In the case of a healthcare Internet of things (IoT) device, uplink transmission occurs more frequently than downlink transmission and improving energy efficiency and latency is a bigger issue that needs to be solved more urgently than increasing throughput of the IoT device. In particular, in the existing access point (AP) connection method, uplink load balancing is not considered, so uplink load may be biased on a specific AP, which leads to increasing the number of retransmissions due to an increase in an IoT data transmission collision probability in a wireless environment. The increase in the number of retransmissions may cause a low energy efficiency issue and a quality of service (QoS) (high latency) issue of IoT devices. Therefore, herein, proposed is an optimal intelligent access point (iAP) connection method and system using reinforcement learning to improve energy efficiency and latency of a plurality of IoT devices. Hereinafter, example embodiments are described with reference to the accompanying drawings.

Figure 1:
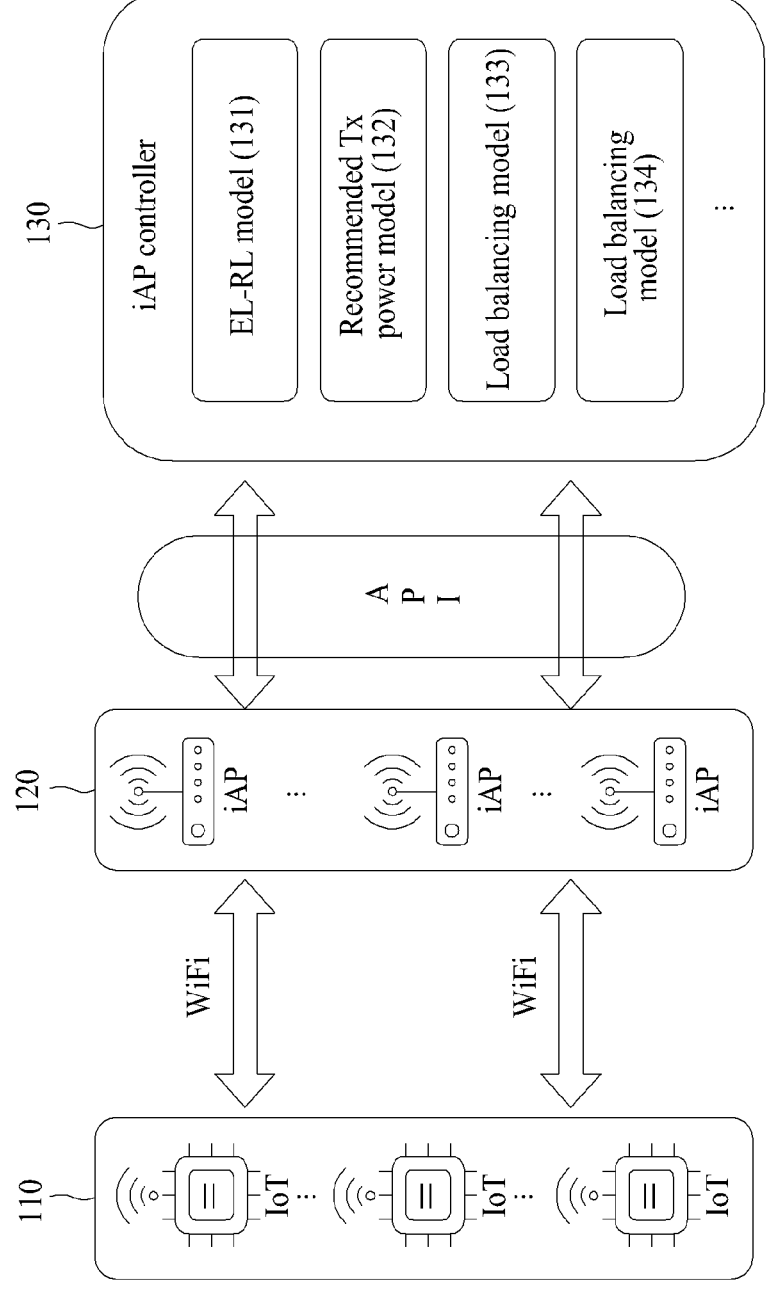
FIG. 1 illustrates overview of an optimal intelligent access point (iAP) connection system using reinforcement learning to improve energy efficiency and latency of Internet of things (IoT) devices according to an example embodiment.

FIG. 1 illustrates overview of an optimal iAP connection system using reinforcement learning to improve energy efficiency and latency of IoT devices according to an example embodiment.

The optimal iAP connection system using reinforcement learning to improve energy efficiency and latency of IoT devices according to an example embodiment includes an IoT device 110, an iAP 120, and an iAP controller 130.

Each of the IoT device 110, the iAP 120, and the iAP controller 130 according to an example embodiment refers to a computing device that includes a memory and a processor and may perform the overall operation by instructions stored in the memory and arithmetic operations of the processor. The IoT device 110, the iAP 120, and the iAP controller 130 may transmit and receive data over a wired/wireless communication network.

In the iAP connection system according to an example embodiment, the IoT device 110, the iAP 120, and the iAP controller 130 may constitute the iAP connection system in such a manner that each of the memory and the processor is configured to perform the following operation.

The IoT device 110 may serve to sense an environment or an object of a surrounding place. For example, the IoT device 110 may be designed to sense predetermined data from a specific object. The IoT device 110 may transmit the sensed data to the iAP controller 130 through the iAP 120, and the iAP controller 130 may perform a specific operation according to a learned control signal.

The iAP 120 may serve to connect a network between the IoT device 110 and the iAP controller 130. The iAP 120 may transmit data between the IoT device 110 and the iAP controller 130 according to a predetermined protocol and, if data is not transmitted properly, may operate according to a designated protocol and may support smooth data communication between the IoT device 110 and the iAP controller 130.

The iAP controller 130 may analyze data sensed by the IoT device 110, may generate a control signal such that the IoT device 110 may perform an operation suitable for a specific situation, and may transmit the control signal to the IoT device 110 through the iAP 120.

The iAP controller 130 may train an artificial intelligence (AI) model that achieves a specific goal (e.g., improving energy efficiency and latency of IoT devices) using a variety of data (e.g., sensing data, IoT settings, network information according to IoT settings, energy efficiency according to IoT settings) obtained from the IoT device 110. The iAP controller 130 may allow the iAP 120 to store the AI model of which training is completed. Therefore, the iAP 120 may change settings of the IoT device 110 (e.g., packet transmission period of the IoT device 110, delivery of traffic indication map (DTIM) value, transmitting power (Tx power), etc.) to achieve the specific goal using the AI model. Further description related to the AI model is made below.

According to an example embodiment, for connection between the IoT devices 110 present in a multiple iAP coverage area and the optimal iAP 120, the software-based centralized iAP controller 130 is proposed.

The proposed iAP controller 130 is present at a cloud server side and may perform reinforcement learning using various AI models including an energy and latency reinforcement (EL-RL) model 131, a recommended transmitting power (Tx power) model 132, a load balancing model 133, and a location estimation model 134, may intelligently select the optimal iAP 120 suitable for a situation, and may improve energy efficiency and latency performance of the IoT device 110 through connection to the corresponding optimal iAP 120 and through control. The AI model for which reinforcement learning is performed may be distributed to the iAP 120 to control and manage the IoT device 110.

The example embodiment aims to develop the reinforcement learning-based EL-RL model 131, to improve energy efficiency and latency performance of the IoT device 110 through connection between the IoT device 110 and the optimal iAP 120 using the developed EL-RL model 131, and to innovatively increase expected lifespan of the IoT device 110 and, at the same time, meet needs from a healthcare IoT service.

The iAP controller 130 according to an example embodiment selects the optimal iAP 120 in consideration of various factors, for example, load balancing between the iAPs 120, energy consumption of the IoT device 110, and latency, and controls the selected iAP 120 to be connected to the IoT device 110.

Since an optimal iAP connection issue continues to vary depending on a situation and an environmental condition, it may be solved through adaptive iAP connection rather than a fixed iAP connection method. For this adaptive optimal iAP connection, the reinforcement learning-based EL-RL model 131 is proposed.

Unlike the existing AP connection method based on signal strength or downlink throughput maximization, the EL-RL model 131 refers to an adaptive reinforcement learning model that operates with optimal iAP connection with a strategy that maximizes a reward by using average energy consumption and average latency of the IoT devices 110 in consideration of the number of uplink transmission attempts and a successful transmission probability according to each transmission attempt.

The example embodiment aims to increase expected lifespan of the IoT device 110 while meeting QoS by improving energy efficiency and latency performance of the IoT device 110 through the optimal iAP connection using the EL-RL model 131.

Figure 2:
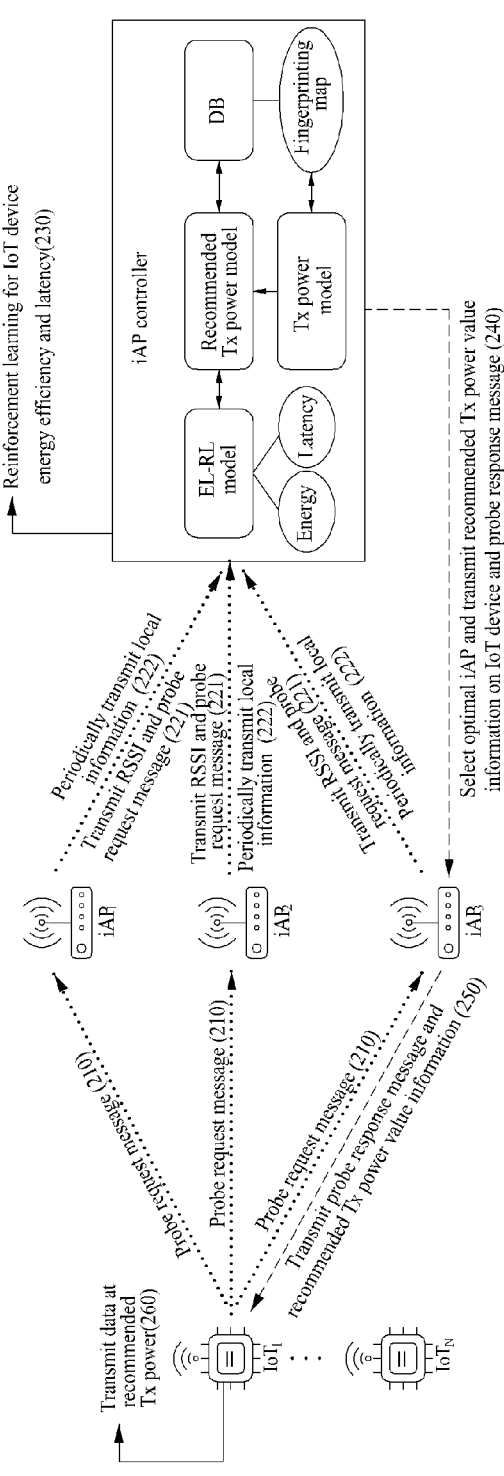
FIG. 2 illustrates an example of explaining an optimal iAP connection method using reinforcement learning to improve energy efficiency and latency of IoT devices according to an example embodiment.

FIG. 2 illustrates an example of explaining an optimal iAP connection method using reinforcement learning to improve energy efficiency and latency of IoT devices according to an example embodiment.

In the optimal iAP connection method using reinforcement learning to improve energy efficiency and latency of IoT devices according to an example embodiment, an IoT device present in a multiple iAP coverage area transmits a probe request message for iAP connection to a plurality of iAPs in operation 210.

In operation 221, each of the plurality of iAPs that receives the probe request message transmits a received signal strength indication (RSSI) value and the probe request message to an iAP controller. In operation 222, each of the plurality of iAPs periodically transmits local information that includes the number of IoT devices connected to each iAP to the iAP controller.

In operation 230, the iAP controller performs reinforcement learning for IoT device energy efficiency and latency using global information that is updated from the local information obtained from the plurality of iAPs.

In operation 240, the iAP controller selects an optimal iAP based on reinforcement learning and transmits recommended Tx power value information on the IoT device and a probe response message to the corresponding iAP.

In operation 250, the corresponding iAP that receives its selection as the optimal iAP in response to the probe request from the iAP controller transmits the probe response message and the recommended Tx power value information to the IoT device.

In operation 260, the IoT device that receives the probe response message from the optimal iAP transmits IoT data at the recommended Tx power through a connection process with the optimal iAP.

Figure 3:
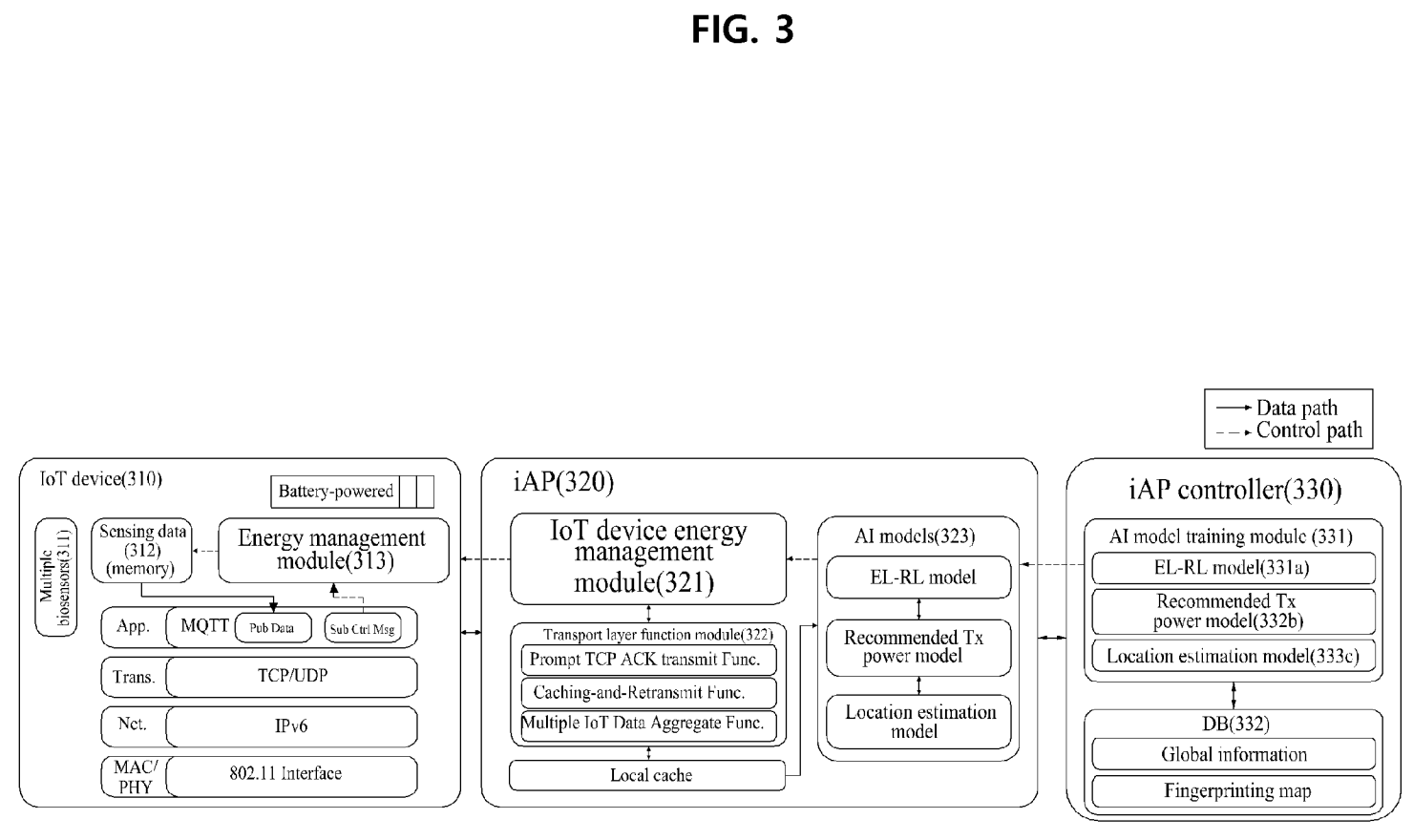

FIG. 3 illustrates a configuration of an optimal iAP connection system using reinforcement learning to improve energy efficiency and latency of IoT devices according to an example embodiment.

The optimal iAP connection system using reinforcement learning to improve energy efficiency and latency of IoT devices according to an example embodiment includes an IoT device 310, a plurality of iAPs 320, and an iAP controller 330. The example embodiment illustrates only a single iAP 320 selected as an optimal iAP for clarity of description.

The plurality of iAPs 320 according to the example embodiment receives a probe request message for iAP connection from the IoT device 310 present within a multiple iAP coverage area.

Each of the plurality of iAPs 320 that receives the probe request message transmits an RSSI value and the probe request message to the iAP controller 330, and periodically transmits local information including the number of IoT devices 310 connected to each iAP 320 to the iAP controller 330.

The iAP controller 330 according to an example embodiment performs reinforcement learning for IoT device energy efficiency and latency using global information that is updated from the local information obtained from the plurality of iAPs 320.

The iAP controller 330 according to an example embodiment performs reinforcement learning using an AI model training module 331 including various models, for example, an EL-RL model 331a, a recommended Tx power model 332b, a load balancing model (not shown), and a location estimation model 333c.

The iAP controller 330 intelligently selects the optimal iAP 320 suitable for a situation based on reinforcement learning and transmits recommended Tx power value information on the IoT device 310 and a probe response message to the selected iAP 320. The iAP controller 330 may improve energy efficiency and latency performance of the IoT device 310 through connection to the corresponding optimal iAP 320 and through control. AI models 323 for which reinforcement learning is performed may be distributed to the iAP 320 to control and manage the IoT device 310.

The IoT device 310 according to an example embodiment receives the probe response message and the recommended Tx power value information from the corresponding iAP 320 that receives its selection as the optimal iAP 320 in response to the probe request. The IoT device 310 that receives the probe response message from the optimal iAP 320 transmits IoT data at recommended Tx power through a connection process with the optimal iAP 320. The IoT device 310 manages energy according to the recommended Tx power received from the optimal iAP 320 through an energy management module 313.

The IoT device 310 according to an example embodiment collects sensing data through multiple biosensors 311 and stores the collected sensing data in a memory 312.

The IoT device 310 according to an example embodiment wirelessly transmits IoT data to the optimal iAP 320 through a message queuing telemetry transport (MQTT) of an application layer using not user datagram protocol (UDP) but a transmission control protocol (TCP) transmission method to ensure protection and high reliability of the IoT data after connection to the optimal iAP 320.

The iAP 320 according to an example embodiment stores the received IoT data in a local cache and retransmits the same to the iAP controller 330.

The iAP controller 330 present in a cloud server according to an example embodiment stores the IoT data received from the iAP 320 in a database (DB) 332 and analyzes the IoT data.

The iAP controller 330 according to an example embodiment trains various AI models 323 through the AI model training module 331 using the analyzed IoT data and distributes the trained AI models 323 to the iAP 320.

An IoT device energy management module 321 in the iAP 320 may transmit an IoT device operating variable value analyzed through a transport layer function module 322 to the IoT device 310 and may control and manage energy consumption of the IoT device 310.

The IoT device 310 may improve the energy efficiency by controlling a data transmission period of the IoT device 310, a DTIM value, Tx power, and the like, based on a control message (e.g., optimal operating variable value) received through the MQTT.

Figure 4:
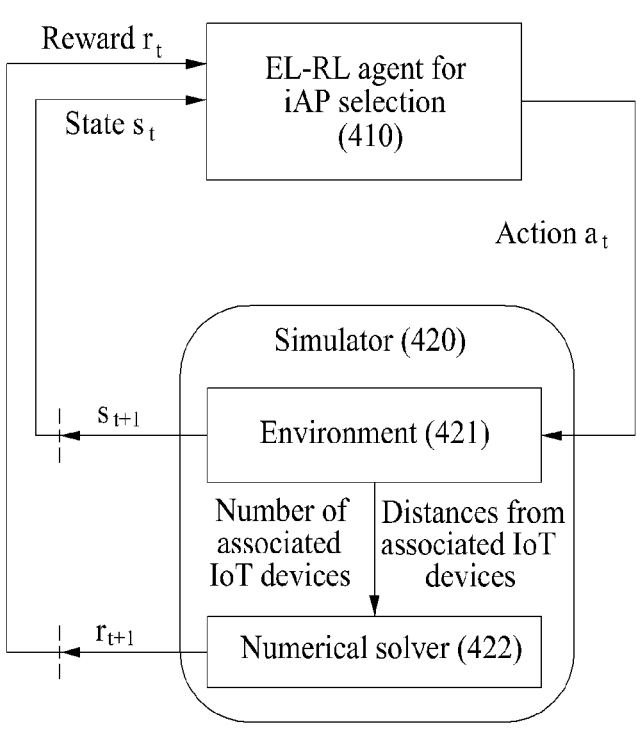
FIG. 4 illustrates an example of explaining an energy and latency reinforcement learning (EL-RL) model according to an example embodiment.

FIG. 4 illustrates an example of explaining an EL-RL model according to an example embodiment.

The EL-RL model according to an example embodiment is a reinforcement learning model for optimal AP connection that considers energy efficiency and latency improvement of IoT devices.

The EL-RL model according to an example embodiment mathematically analyzes average energy consumption ($E_{i,j}$) and average latency ($L_{i,j}$) of IoT devices in consideration of the number of uplink transmission attempts and a successful transmission probability according to each transmission attempt, and performs reinforcement learning using the same as parameters. That is, the EL-RL model performs learning with a policy that minimizes an objective function configured with a weighted sum of the average energy consumption and the average latency of IoT devices.

According to an example embodiment, an environment 421 of a simulator 420 transmits state $s_t$ to an EL-RL agent 410 for optimal iAP selection. State information $s_t$ is set based on an RSSI value between an IoT device to be connected and a candidate iAP and the number of nodes connected to the iAP. Here, action $a_t$ represents an iAP to be connected between candidate iAPs. Then, a numerical solver 422 of the simulator 420 calculates reward $r_t$ using the number of connected IoT devices and distances from the connected IoT devices according to the action. Also, reward $r_t$ is calculated based on the average energy consumption and the average latency of IoT devices. Therefore, minimizing the average energy consumption and the average latency of all IoT devices is set as an objective function of the EL-RL model. The EL-RL agent 410 receives reward $r_t$ from the numerical solver 422 and selects a new action. This process is iteratively performed and the EL-RL agent 410 iteratively performs reinforcement learning to obtain a maximum reward.

Notations used in the EL-RL model are defined as follows:
State $s_t$
Global information ($RSSI_{i,j}$, $n_{i,j}$) where $i \in 1, 2, \ldots, N_{IoT}$), $j \in 1, 2, \ldots, N_{AP}$). Candidate iAP set $C_i$ for an IoT device i where $C_i = (iAP_1, iAP_2, \ldots, iAP_{cj})$.
Action $a_t$
Selected iAPs for the IoT device i where $C_i = (iAP_1, iAP_2, \ldots, iAP_{cj})$.

Reward (penalty) $r_t$ $\alpha \cdot E_{i,j} + \beta \cdot L_{i,j}$

Policy

Figure 5:
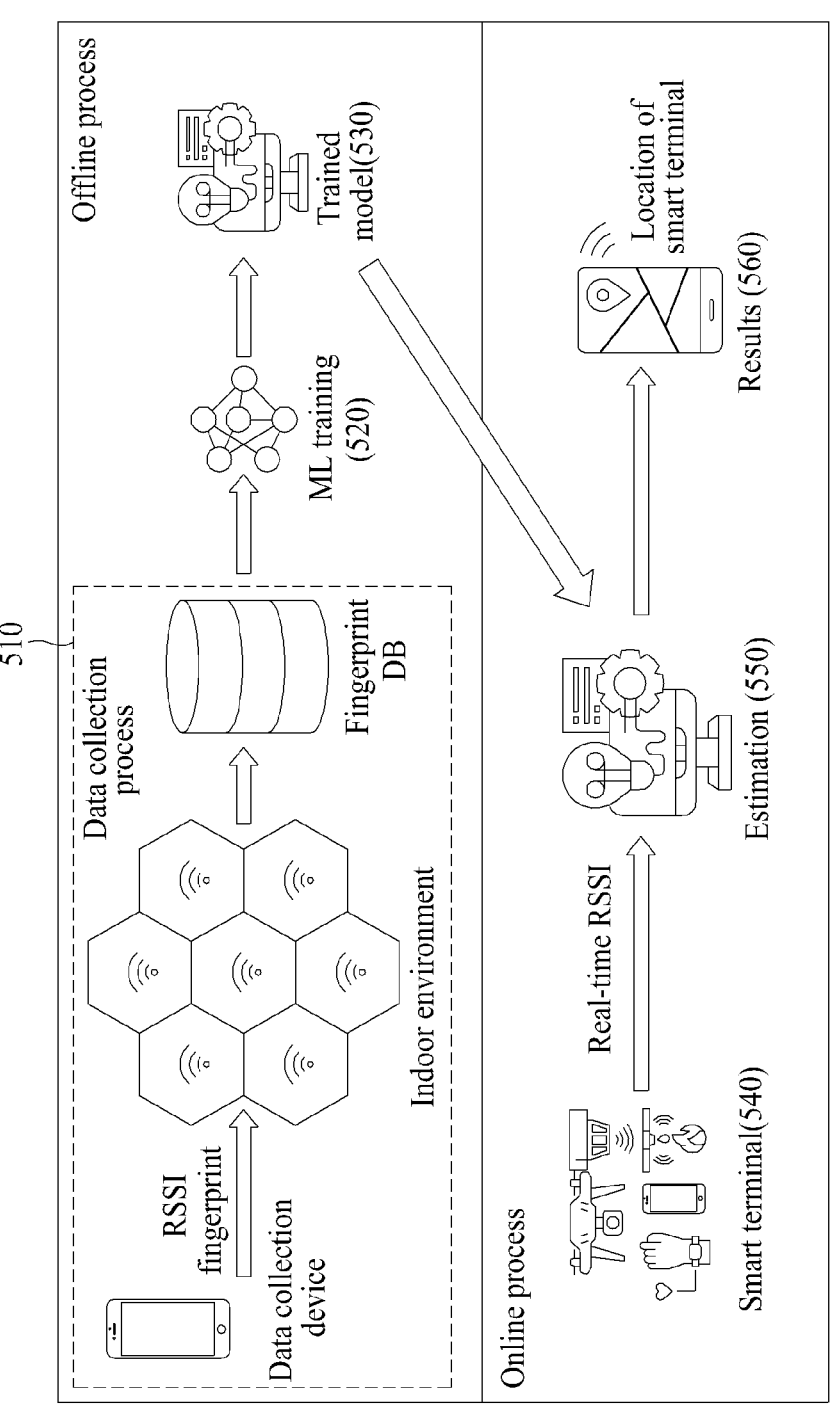
FIG. 5 illustrates an example of explaining a location estimation model and a recommended transmitting power (Tx power) model according to an example embodiment.

Minimize the objective function, $f(i) = \text{argmin}\{\alpha \cdot E_{avg} + \beta \cdot L_{avg}\}$ FIG. 5 illustrates an example of explaining a location estimation model and a recommended Tx power model according to an example embodiment.

The location estimation model according to an example embodiment employs a fingerprinting method. Through the location estimation model according to an example embodiment, the fingerprinting method may estimate a location by comparing RSSI values input to a fingerprinting map including reference point values stored in a DB in a data collection 510 of an offline process. This fingerprinting machine learning (ML) training method 520 is known as a most suitable method for estimating a location in an indoor environment.

The location estimation model according to an example embodiment may collect RSSI in real time through an IoT device, that is, a start terminal 540 in an online process, may estimate 550 a location of the IoT device using a pretrained model 530, and may obtain an estimated location value as a result 560.

As described above, after obtaining the estimated location value of the IoT device and then calculating a distance from a candidate iAP, a recommended Tx power value of the IoT device is calculated based on a distance through the recommended Tx power model according to an example embodiment.

Then, through the aforementioned EL-RL model according to an example embodiment, an optimal iAP may be selected and the selected iAP may transmit the calculated recommended Tx power value to the IoT device, which may lead to improving energy efficiency of the IoT device used for uplink transmission.

The recommended Tx power according to an example embodiment may be calculated according to Equation (1):

$$P_{tx}^{adaptive} = \frac{P_I + P_N}{L}\gamma^* = \frac{P_I + P_N}{L}\left[\exp\left(1 + W\left[\frac{A_2/A_1 - 1}{e}\right]\right) - 1\right]$$

Equation (1)

Here, $A_1 = \frac{\mu L_o N_m(1 + P_e)}{B d^{-a} h}(P_I + P_N)$ and $A_2 = \frac{N_m(1 + P_e)P_o}{B}$.

$$P_{tx}^{adaptive}$$

denotes adaptive recommended Tx power according to a distance between the IoT device and the iAP. $P_I$ denotes interference power observed at the iAP, and $P_N$ denotes noise power observed at the iAP. Also, L denotes a total loss factor according to a transmission distance between the IoT device and the iAP, and the total loss factor may be expressed as $$L = \frac{1}{L_o}d^{-a}h.$$

$L_o$ denotes a constant value depending on a transmission frequency and an antenna gain, and d denotes a distance (meter) between a transmitter and a receiver. Also, $\alpha$ denotes a path-loss exponent, and h denotes a random variable representing channel fading. Also, $\gamma^*$ denotes a minimum target signal-to-interference noise ratio (SINR) for signal decoding at the iAP.

W denotes a Lambert-W function that is $W[z]e^{W[z]} = z$. A value of $A_1$ Includes $$A_1 = \frac{\mu L_o N_m(1 + P_e)}{B d^{-a} h}(P_I + P_N).$$

Here, $\mu$ denotes a conversion factor of a power amplifier that converts an electrical signal to radio frequency (RF) power and then transmits the same. Also, $N_m$ denotes a message length (byte) to be transmitted, $P_e$ denotes a retransmission probability, and B denotes a channel bandwidth. Also, a value of $A_2$ is configured as $$A_2 = \frac{N_m(1 + P_e)P_o}{B}.$$

Here, $P_O$ denotes electronic power consumption overhead incurring in a communication module to encode a message to be transmitted.

Figure 6:
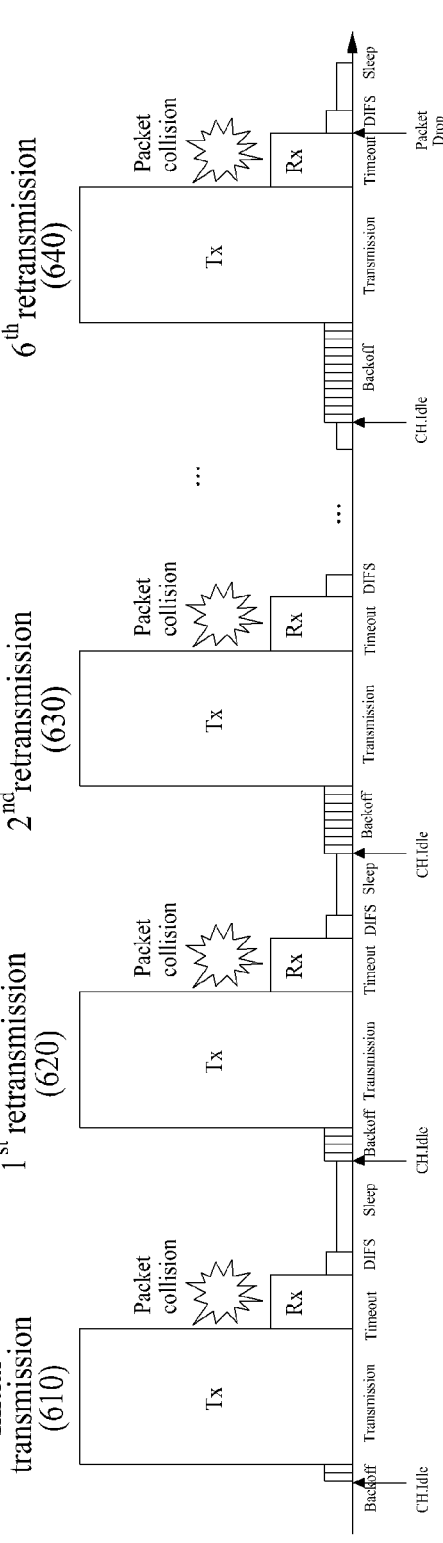
FIG. 6 illustrates an example of explaining a retransmission process resulting from a packet collision and an IoT device energy consumption according to an example embodiment.

FIG. 6 illustrates an example of explaining a retransmission process resulting from a packet collision and an IoT device energy consumption according to an example embodiment.

When an IoT device according to an example embodiment operates with a battery, the IoT device may need to be able to sense surroundings while maintaining power for a long time and may need to stably transmit sensed data to an iAP controller. Therefore, it is important to improve power efficiency of the IoT device. Prior to describing the example embodiment, an environment assumed for the example embodiment is described.

A beacon frame refers to a packet that an iAP periodically broadcasts to allow the IoT device to participate in a wireless network. The IoT device may be set to wait in a sleep mode and to wake up from the sleep mode and to start communication with the outside at a point time at which a specific number of beacon frames are received according to a set DTIM period. For example, if the DTIM period is set to 3, the IoT device may perform an operation according to a predetermined cycle and then wait in the sleep mode and may wake up from the sleep mode and then perform an operation again according to a predetermined cycle at a point in time at which the IoT device receives a third beacon frame.

The example embodiment describes a system in which a DTIM period is set to 1 as an example for clarity of description. Also, in the example embodiment, a transmission mode and a reception mode are used as an example based on transmission of data sensed by the IoT device and an operation of the transmission mode and the reception mode for transmission and reception of acknowledgement (ACK) between the IoT device and a server or beacon frame reception is omitted for clarity of description.

During an uplink transmission of an IoT device according to an example embodiment, a packet collision occurs when different IoT devices, that is, the IoT device and another IoT device simultaneously transmit a packet and accordingly, a retransmission is required, which leads to increasing IoT device energy consumption.

When different IoT devices simultaneously transmit a packet during an initial transmission attempt (that is, first transmission attempt) 610, a collision occurs between transmission packets of the different IoT devices and a timeout may occur since ACK is not received.

Afterwards, when a channel is sensed to be in an idle state (CH.Idle), the IoT device attempts a first retransmission 620 after a random backoff time within a double contention window size.

When the different IoT devices simultaneously transmit a packet even in the first retransmission (i.e., second transmission attempt) 620, a collision occurs between transmission packets of the different IoT devices and a timeout for not receiving ACK may occur.

Afterwards, when the channel is sensed to be in the idle state (CH.Idle), the IoT device attempts a second retransmission 630 after a random backoff time within a double contention window size.

Even a collision during the second retransmission (i.e., third transmission attempt) 630 goes through the same process as the previous process. If a collision occurs even during a final sixth retransmission attempt, the packet is discarded (packet drop) and there is no further retransmission attempt.

Hereinafter, the average energy consumption and the average latency of IoT devices are numerically analyzed in consideration of the number of transmission attempts including a retransmission and a successful transmission probability according to each transmission attempt.

To analyze retransmission energy consumption of IoT devices, a collision probability is numerically calculated based on an actual collision simulation. In the example embodiment, it is assumed that an IoT device may transmit the same packet a total of seven times, including an initial transmission. The collision probability for each transmission attempt is defined as $P_c(n)$ and a transmission attempt probability is defined as $P_a(n)$ in follows:

$P_c(n)$: collision probability according to an $n^{th}$ transmission attempt $P_a(n)$: $n^{th}$ transmission attempt probability Therefore, the $n^{th}$ transmission attempt probability $P_a(n)$ is given as follows:

$$P_a(n) = \left(1 - e^{-\lambda}\right)\prod_1^n P_c(n-1), \text{ s.t. } P_c(0) = 1. \qquad \text{Equation (2)}$$

The collision probability of transmission may be calculated as in Equation (3) from a new perspective:

$$P_c(n) = \sum_{a_1,a_2,a_3,a_4,a_5,a_6,a_7} P_s\binom{N-1}{a_1}P_a(1)^{a_1}\binom{N-1}{a_2}-a_1\right)P_a(2)^{a_2} \cdots \binom{N-1-(a_1+a_2+\cdots+a_6)}{a_7}P_a(7)^{a_7}(1-P_A)^{a_0} \qquad \text{Equation (3)}$$

$$= \sum_{a_1,a_2,a_3,a_4,a_5,a_6,a_7} P_s\frac{(N-1)!}{a_1!a_2!a_3!a_4!a_5!a_6!a_7!}P_a(1)^{a_1}P_a(2)^{a_2}\cdots P_a(7)^{a_7}(1-P_A)^{a_0}$$

$$= \sum_{a_1,a_2,a_3,a_4,a_5,a_6,a_7} P_s\frac{(N-1)!}{\prod_{n=1}^{m+1}(a_n)!}\prod_{n=1}^{m+1}P_a(n)^{a_n}(1-P_A)^{a_0},$$

$$\text{s.t. } N-1 = \prod_{n=1}^{m+1}a_n,$$

This collision probability is calculated by considering a packet collision probability within a single arbitrary timeslot. Also, the collision probability considers an actual collision probability for ML training that may be numerically solved. If there is a transmitting device in a single timeslot at an arbitrary point in time, it is assumed that the number of IoT devices attempting an initial transmission in the corresponding timeslot is expressed as $a_1$ and the number of devices attempting a second transmission is expressed as $a_2$. Likewise, it is assumed that the number of IoT devices attempting a third transmission in the corresponding timeslot is expressed as a 3 and the number of devices attempting a seventh transmission is expressed as a 7. Also, the number of devices with no transmission attempt in the corresponding timeslot is expressed as $a_0$. Assuming that a device transmits a packet in a certain timeslot, if there is at least one device attempting a transmission, it is defined as a packet collision. The collision probability is defined as a sum of values obtained by multiplying the number of cases in which a collision may occur and the transmission attempt probability. Here, if there is no transmission from any IoT device in the corresponding timeslot, $P_S$ has a value of 0 and it is considered that no collision has occurred. On the contrary, there is another transmission, $P_S$ has a value of 1. Also, $P_A$ is defined as a sum of all transmission attempt probabilities. The collision probability based on such actual collision was calculated with numerical techniques.

According to an example embodiment, the average energy consumption of IoT devices may be calculated based on the collision probability. The average energy consumption of IoT devices may be obtained as a sum of product of probability of all transmission attempts, probability of successful transmission without a packet collision, and an energy consumption value according to an $n^{th}$ transmission attempt. The average energy consumption of IoT devices is given as follows:

$$E_{avg} = \sum_1^n \frac{P_a(n)}{1-e^{-\lambda}}[1-P_c(n)]E(n). \qquad \text{Equation (4)}$$

Energy consumed by the $n^{th}$ transmission attempt is a sum of product of an operation time of each operation mode and power used in a corresponding operation mode and is given as follows:

$$E(n) = P_{tx}^{adaptive} * T_{tx}(n) + P_{rx} * T_{rx}(n) + P_{sleep} * T_{sleep}(n). \qquad \text{Equation (5)}$$

A total Tx mode time according to a transmission attempt includes a data transmission time and an ACK transmission time and is given as follows:

$$T_{tx}(n) = n * \frac{N_{data}}{Blog_2(1+\gamma)} + \frac{N_{L2ack}}{Blog_2(1+\gamma)} \qquad \text{Equation (6)}$$

Here, according to an example embodiment, $N_{data}$ is 104 bytes, $N_{L2ack}$ is 54 bytes, B is 160 kHz, and $\gamma$ is 40 dB. A data transmission time may be obtained by multiplying the number of transmission attempts by a time used to transmit a single piece of transmission data, and an ACK transmission time may be obtained by a time used to transmit an L2ACK message once.

A total receive (Rx) mode time according to a transmission attempt is given as follows:

$$T_{rx}(n) = (n-1) * T_{ACKtimeout} + T_{ACKtim} + T_{beacons} \qquad \text{Equation (7)}$$

Here, according to an example embodiment, $T_{ACKtimeout}$ is 337 μs, $T_{ACKtime}$ is 44 μs, and $T_{beacon}$ is |Iperiod/(n_dtim*I_beacon)|*t_beacon μs.

A time calculated in an Rx mode is a sum of an ACKtime time value, a beacon Rx time value, and product of the number of times sent so far and a time set by ACKtimeout.

A total sleep mode time according to a transmission attempt is given as follows:

$$T_{sleep}(n) = I_{period} - T_{tx}(n) - T_{rx}(n), \qquad \text{Equation (8)}$$

Here, $I_{period}$ according to an example embodiment is 1 s of a transmission period. The total sleep mode time per transmission attempt may be obtained by subtracting the Tx mode time and the Rx mode time from the period.

To calculate the average energy consumption and the average latency of an IoT devices, RSSI values and the number of IoT devices connected to an iAP are used. An objective function of the proposed EL-RL model is given as follows:

$$J(i) = \text{argmin}\{\alpha * E_{avg} + \beta * L_{avg}\}, \qquad \text{Equation (9)}$$

The goal of the objective function is to minimize the average energy consumption and the average latency.

Also, the average latency of an IoT device according to an example embodiment may be obtained as a sum of product of probability of all transmission attempts, probability of successful transmission without a packet collision, and an energy consumption value according to an $n^{th}$ transmission attempt and product of a packet collision probability and a time consumed for the packet collision.

The average latency of the IoT device according to an example embodiment is given as follows:

$$L_{avg} = \sum_{1}^{n} \frac{P_a(n)}{1 - e^{-\lambda}} [\sigma(n) + (1 - P_c(n))T_a(n) + P_c(n)T_c(n)]. \qquad \text{Equation (10)}$$

Here, $\sigma(n)$ denotes an average backoff time, $1-P_c(n)$ denotes a success probability of an $n^{th}$ transmission, and $P_c(n)$ denotes a collision probability in the $n^{th}$ transmission.

As described above, simulation was performed to verify performance of an optimal AP connection method and system using reinforcement learning to improve energy efficiency and latency of IoT devices according to an example embodiment. An environment for performing the simulation is assumed as follows:

As an iAP device according to an example embodiment, three iAPs having overlapping coverage are assumed and a distance between the iAPs and cell coverage are as follows:

distance between iAPs: 20 m (triangle position)

iAP cell coverage: radius 15 m (circular cell)

It is assumed that IoT devices according to an example embodiment are distributed in a form of a normal distribution centered on an iAP.

As for a distribution ratio of IoT devices between iAPs, the simulation was performed for three distribution ratios [iAP$_1$:iAP$_2$:iAP$_3$]=[1:1:1], [1:9:9], [1:10:3].

The total numbers of IoT devices are assumed as 50, 100, 150, and 200.

An uplink transmission amount per IoT device is assumed to be 64 bytes/1 second.

The average energy consumption and the average latency were obtained through 500 simulations.

Figure 7A:
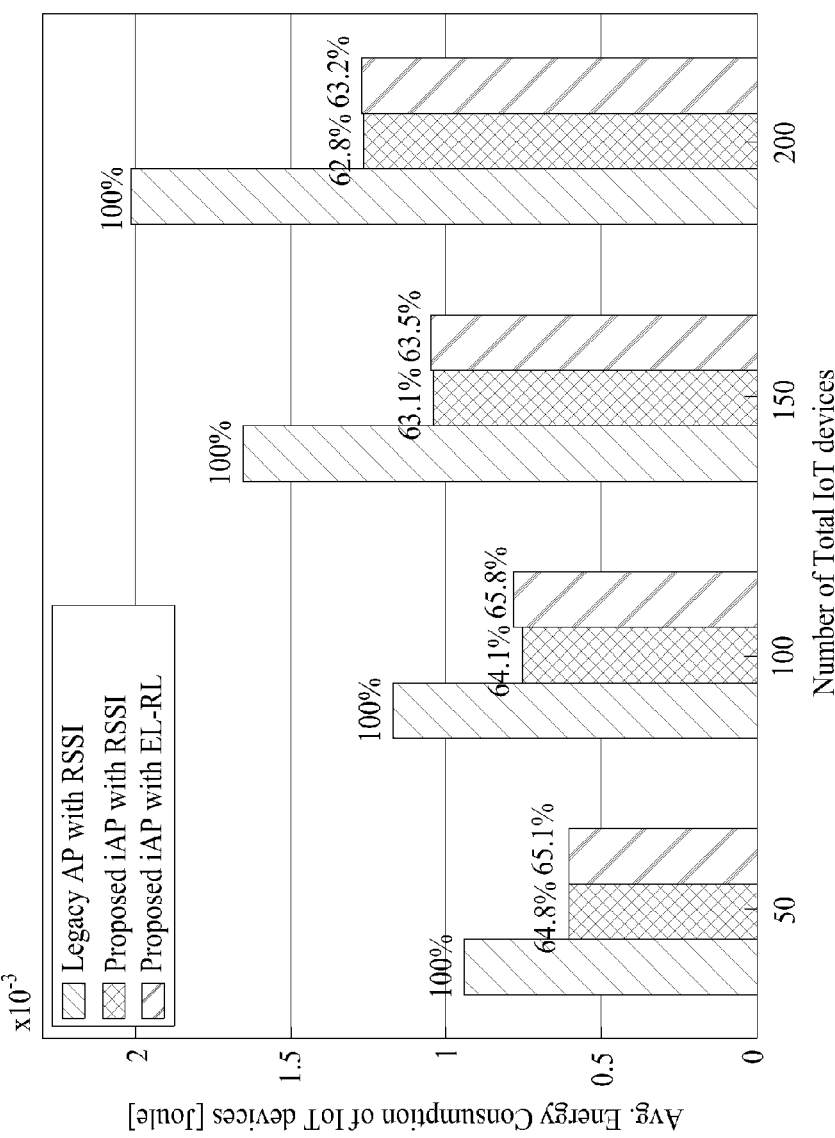
FIGS. 7A, 7B, and 7C are graphs showing energy efficiency improvement of IoT devices according to an example embodiment.
Figure 7B:
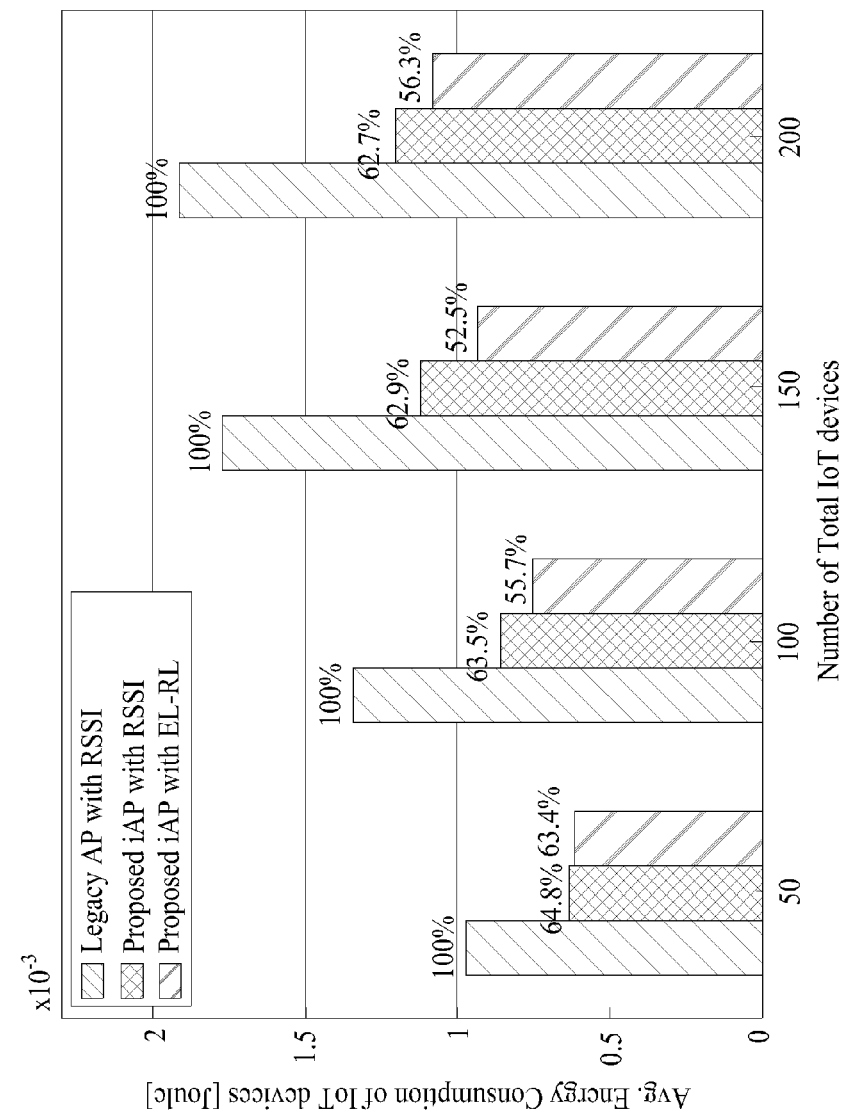
Figure 7C:
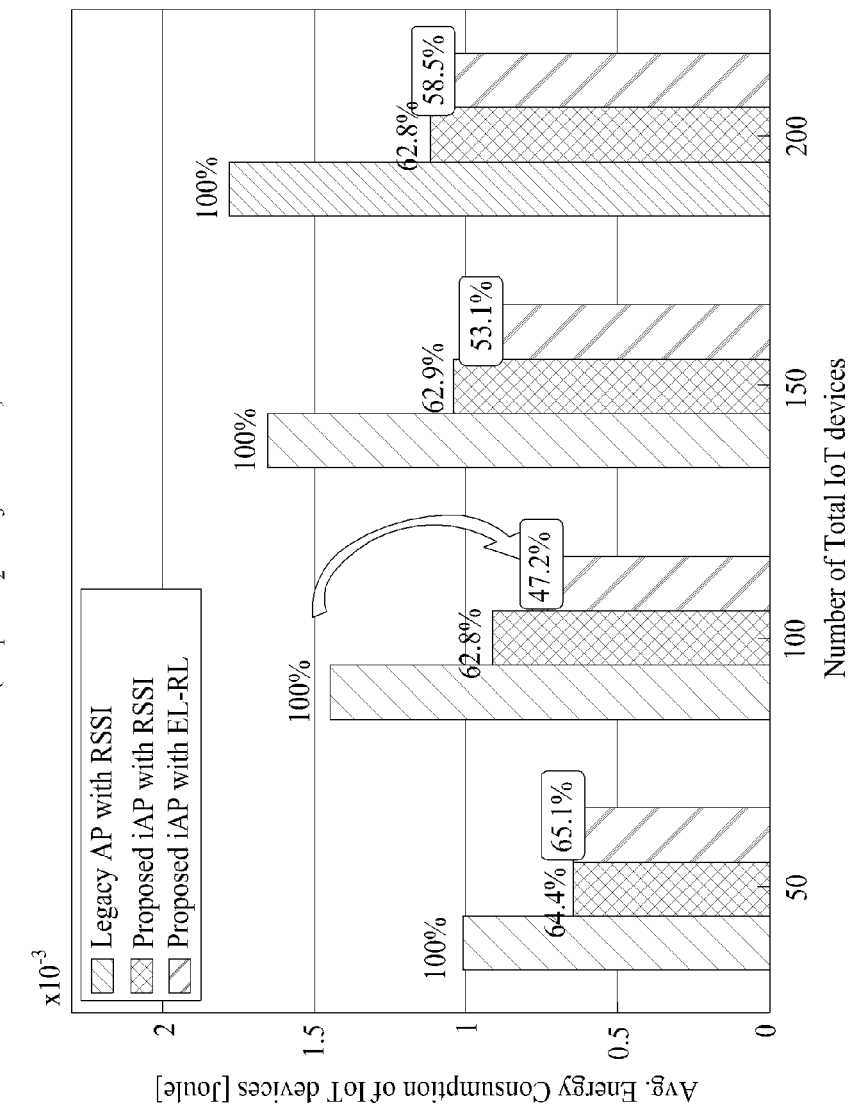

FIGS. 7A, 7B, and 7C are graphs showing energy efficiency improvement of IoT devices according to an example embodiment.

Three distribution ratios [1:1:1] (FIG. 7A), [1:9:9] (FIG. 7B), and [1:10:3] (FIG. 7C) regarding distribution ratios of IoT devices between iAPs [iAP$_1$: iAP$_2$: iAP$_3$] according to an example embodiment were compared to IoT device energy efficiency of an AP connection method according to the related art.

An optimal iAP connection based on an EL-RL model according to an example embodiment demonstrates a maximum of 53% in energy efficiency improvement.

It can be seen that the average energy efficiency is greatly improved as the load distribution of IoT devices between iAP according to an example embodiment becomes more unbalanced. It can be seen that the average energy efficiency of IoT devices is improved by at least 34% by an iAP system even when the load distribution is balanced.

Figure 8A:
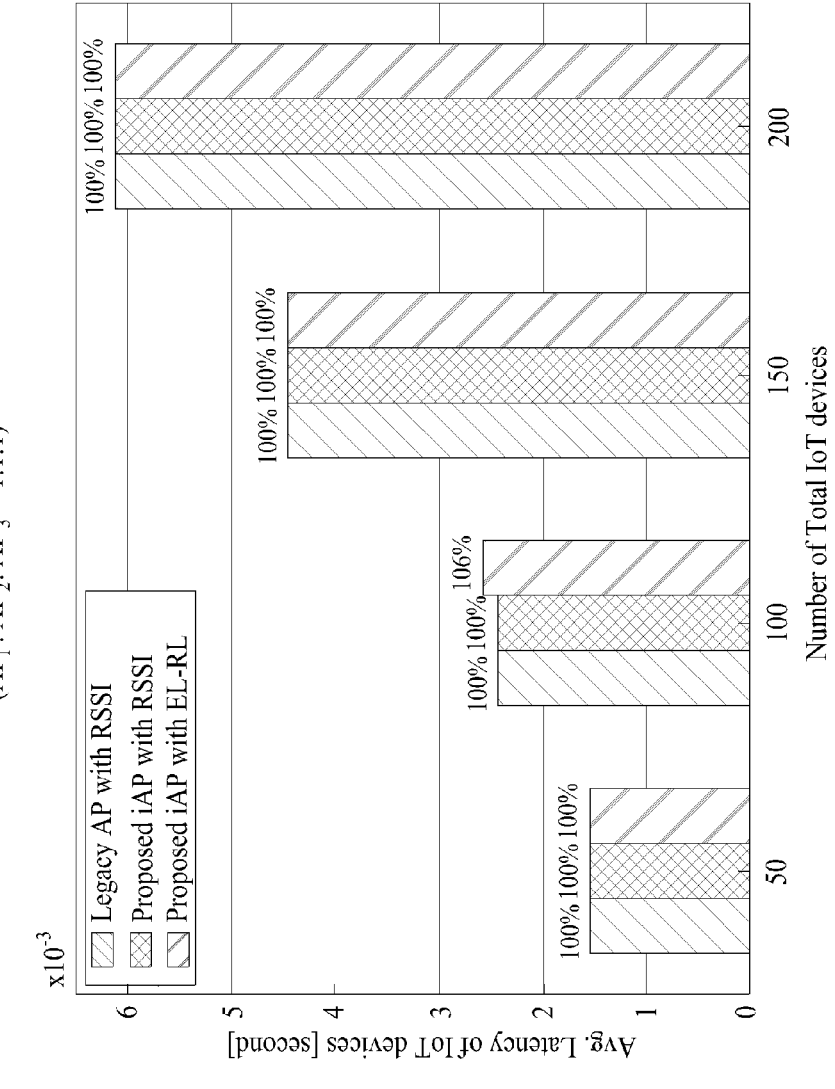
FIGS. 8A, 8B, and 8C are graphs showing latency performance improvement of IoT devices according to an example embodiment.
Figure 8B:
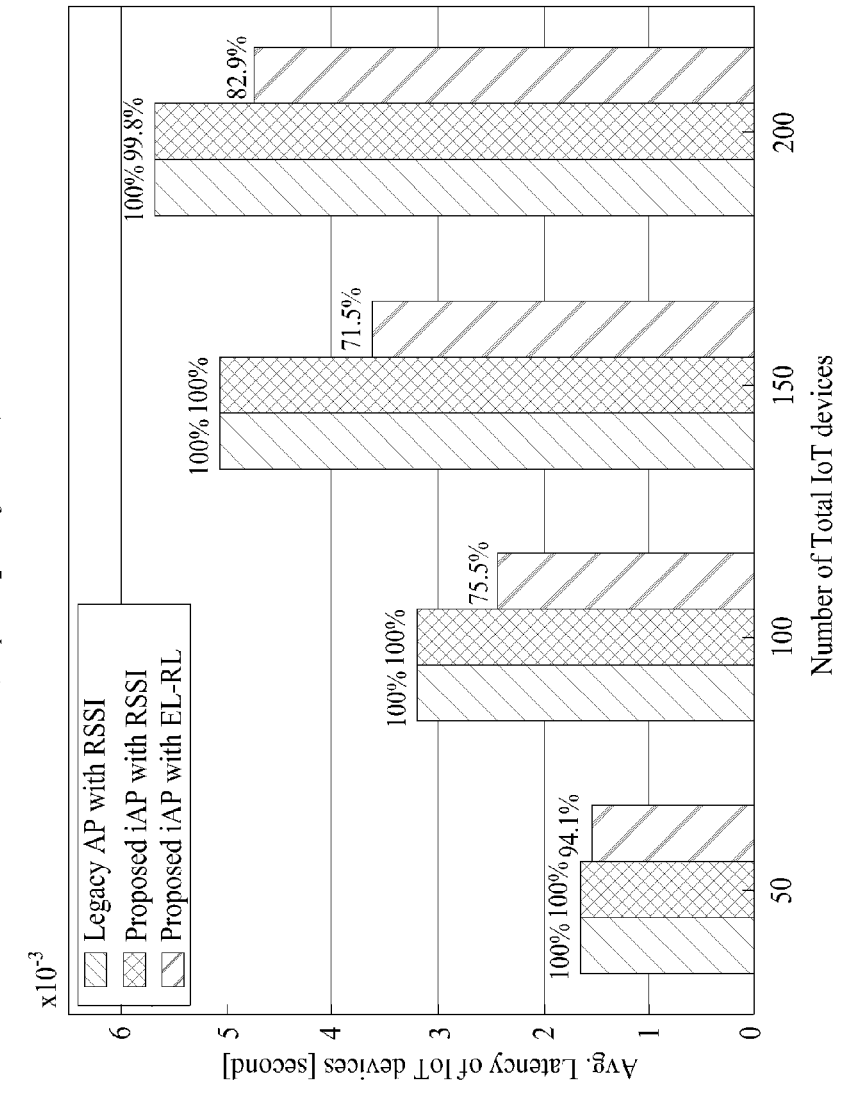
Figure 8C:
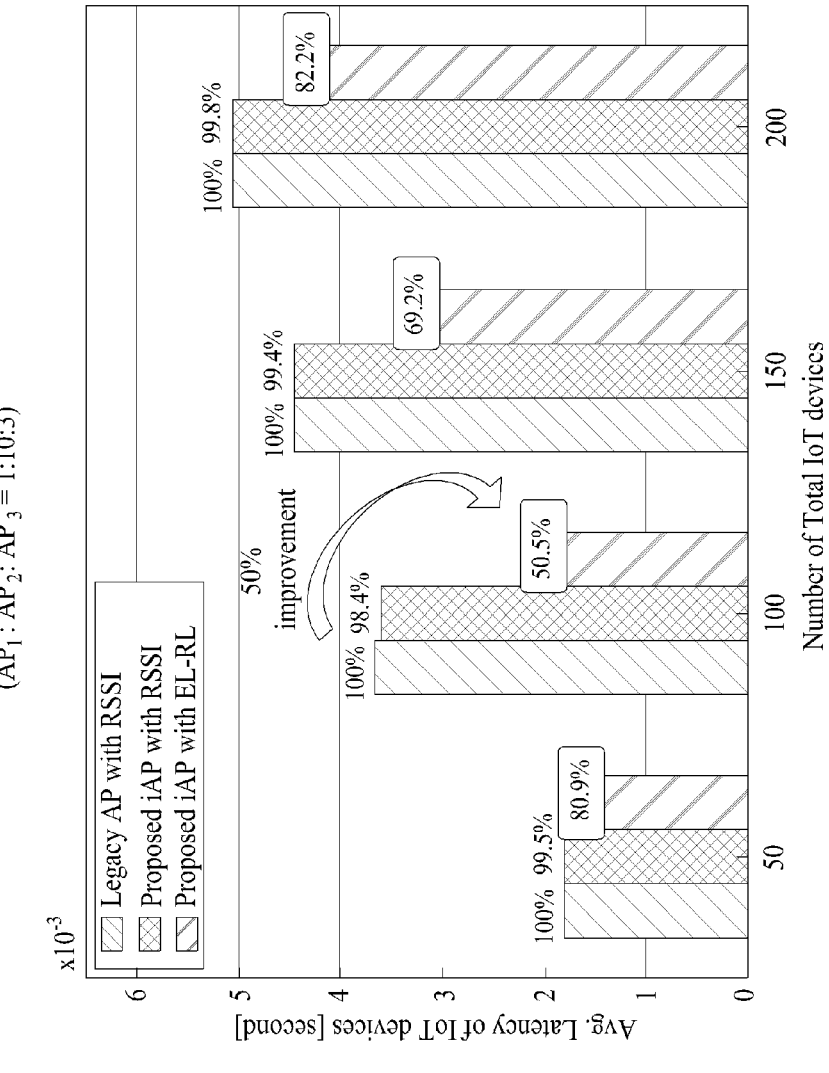

FIGS. 8A, 8B, and 8C are graphs showing latency performance improvement of IoT devices according to an example embodiment.

Three distribution ratios [1:1:1] (FIG. 8A), [1:9:9] (FIG. 8B), and [1:10:3] (FIG. 8C) regarding distribution ratios of IoT devices between iAPs [iAP$_1$: iAP$_2$: iAP$_3$] according to an example embodiment were compared to IoT device latency performance improvement of an AP connection method according to the related art.

The optimal iAP connection based on the EL-RL model according to an example embodiment demonstrates a maximum of 50% in latency performance improvement.

Figure 9A:
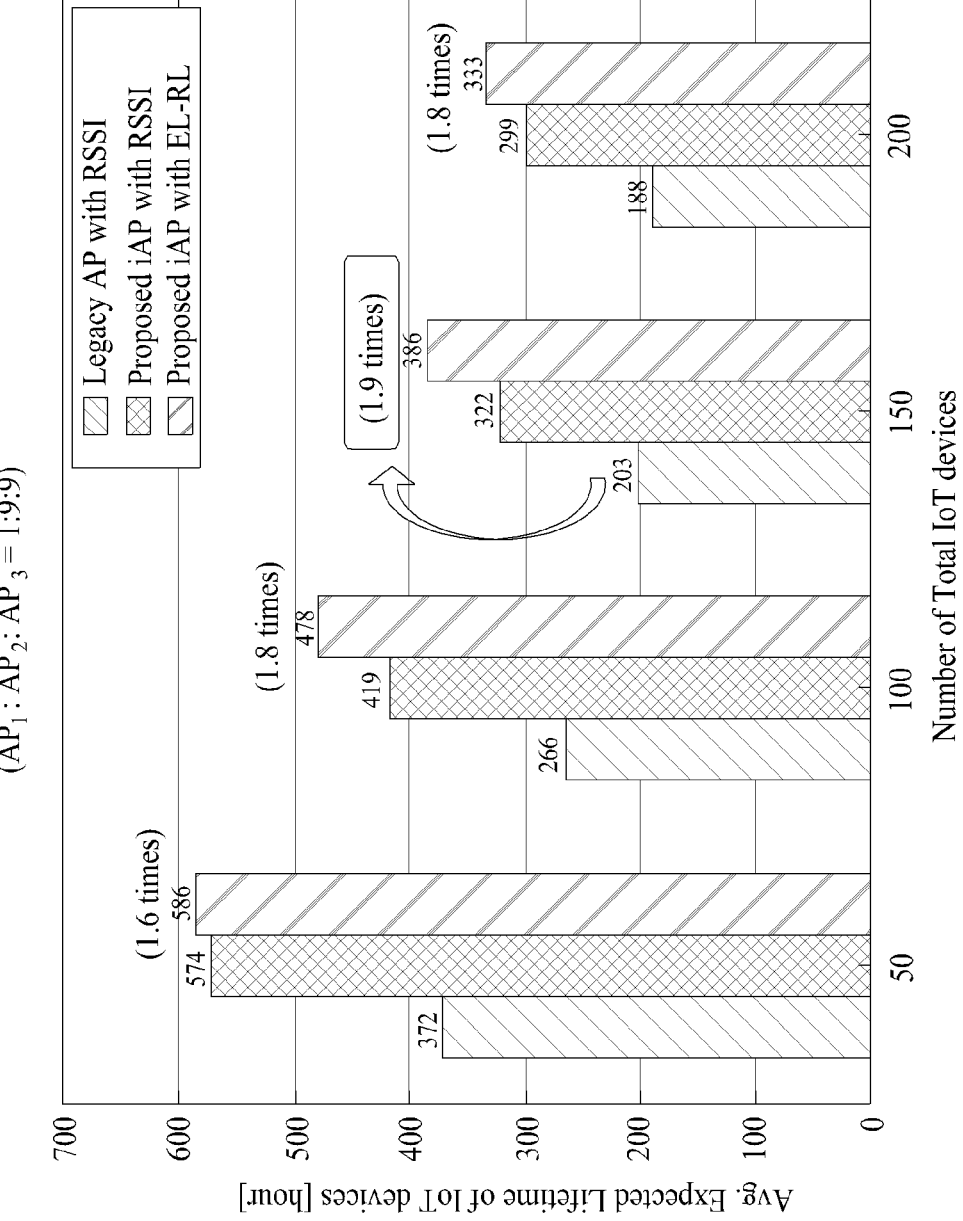
FIGS. 9A and 9B are graphs showing expected lifespan improvement of IoT devices according to an example embodiment.
Figure 9B:
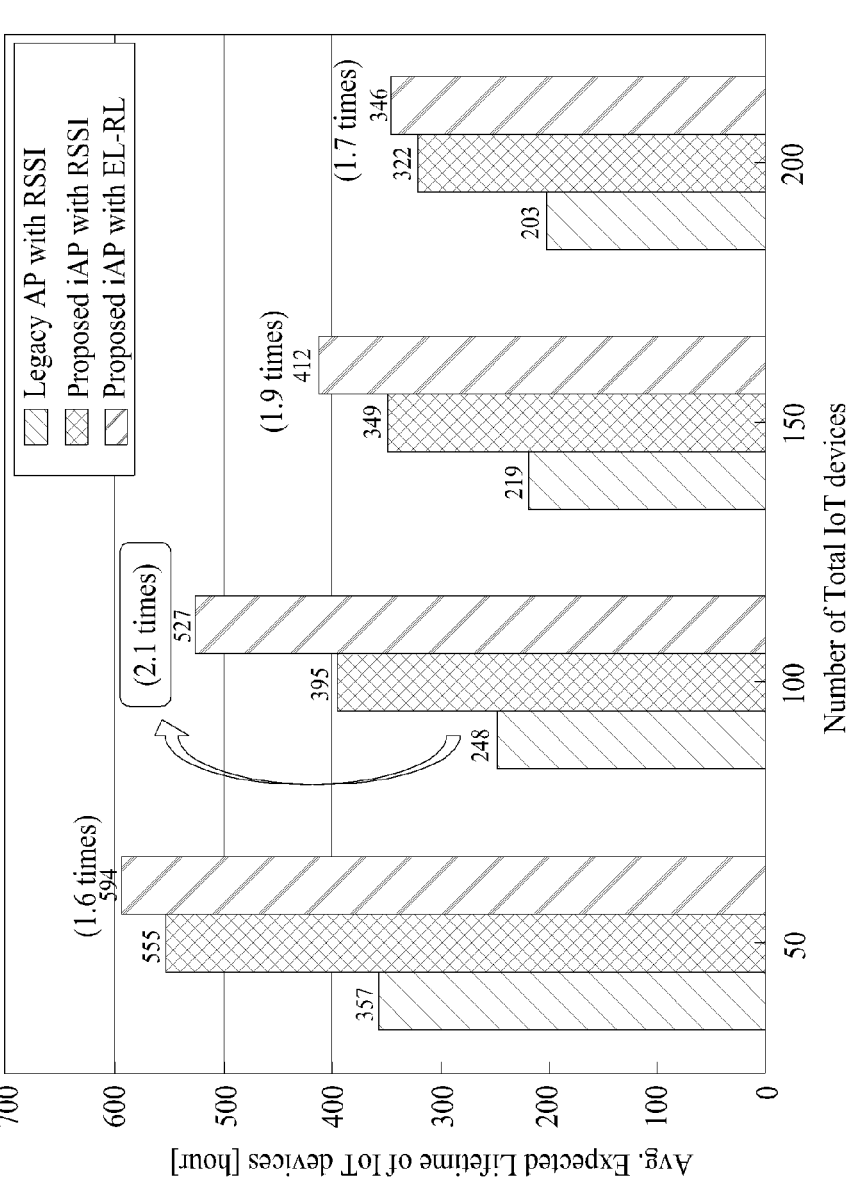

FIGS. 9A and 9B are graphs showing expected lifetime improvement of IoT devices according to an example embodiment.

Two distribution ratios [[1:9:9] (FIG. 9A) and [1:10:3] (FIG. 9B) regarding distribution ratios of IoT devices between iAPs [iAP$_1$: iAP$_2$: iAP$_3$] according to an example embodiment were compared to IoT device expected lifespan improvement of an AP connection method according to the related art.

It can be seen that the optimal iAP connection based on the EL-RL model according to an example embodiment improves the expected lifespan by up to 2.1 times. It can be seen that the expected lifespan of IoT devices is improved, roughly ranging from 1.6 times to 2.1 times, even when the load distribution is in an unbalanced situation.

The apparatuses described herein may be implemented using hardware components, software components, and/or combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, virtual equipment, computer storage medium or device, to be interpreted by the processing device or to provide instructions or data to the processing device. The software also may be distributed over network coupled computer systems so that the software is stored and executed in a distributed fashion. In particular, the software and data may be stored by one or more computer readable storage mediums.

The methods according to the example embodiments may be implemented in a form of program instructions executable through various computer methods and may be recorded in non-transitory computer-readable media. Also, the media may include, alone or in combination with the program instructions, data files, data structures, and the like. Program instructions stored in the media may be those specially designed and constructed for the example embodiments, or they may be of the kind well-known and available to those having skill in the computer software arts. Examples of the media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both a machine code, such as produced by a compiler, and files containing a higher level code that may be executed by the computer using an interpreter.

Although the example embodiments are described with reference to some specific example embodiments and accompanying drawings, it will be apparent to one of ordinary skill in the art that various alterations and modifications in form and details may be made in these example embodiments without departing from the spirit and scope of the claims and their equivalents. For example, suitable results may be achieved if the described techniques are performed in different order, and/or if components in a described system, architecture, device, or circuit are combined in a different manner, and/or replaced or supplemented by other components or their equivalents.

Therefore, other implementations, other example embodiments, and equivalents of the claims are to be construed as being included in the claims.

What is claimed is:

1. An access point (AP) connection method using reinforcement learning, the method comprising:

transmitting, by an Internet of things (IoT) device present within a multiple intelligent access point (iAP) coverage area, a probe request message for iAP connection to a plurality of iAPs;

transmitting, by each of the plurality of iAPs that receives the probe request message, a received signal strength indication (RSSI) value and the probe request message to an iAP controller and periodically transmitting local information that includes the number of IoT devices connected to each iAP to the iAP controller;

performing, by the iAP controller, reinforcement learning for IoT device energy efficiency and latency using global information that is updated from the local information obtained from the plurality of iAPs, the iAP controller including an energy and latency reinforcement learning (EL-RL) model, a location estimation model, and a recommended Tx power model to perform reinforcement learning;

selecting, by the iAP controller, an optimal iAP based on reinforcement learning and transmitting recommended Tx power value information on the IoT device and a probe response message to the selected corresponding iAP;

transmitting, by the corresponding iAP that receives its selection as the optimal iAP in response to the probe request from the iAP controller, the probe response message and the recommended Tx power value information to the IoT device; and transmitting, by the IoT device that receives the probe response message from the optimal iAP, IoT data at recommended Tx power through a connection process with the optimal iAP.

2. The method of claim 1, wherein the performing, by the iAP controller, reinforcement learning for IoT device energy efficiency and latency using global information that is updated from the local information obtained from the plurality of iAPs comprises numerically analyzing average energy consumption and average latency of the IoT devices according to the number of uplink transmission attempts of the IoT device and a successful transmission probability according to each transmission attempt through the EL-RL model of the iAP controller and performing reinforcement learning with a policy that minimizes an objective function configured with a weighted sum of the average energy consumption and the average latency of the IoT devices according to analysis results.

3. The method of claim 2, wherein the performing, by the iAP controller, reinforcement learning for IoT device energy efficiency and latency using global information that is updated from the local information obtained from the plurality of iAPs comprises transmitting a state to an EL-RL agent of the EL-RL model for optimal iAP selection in an environment of a simulator for performing reinforcement learning through the EL-RL model, and the state is set based on an RSSI value between an IoT device to be connected and a candidate iAP and the number of IoT devices connected to the iAP, a reward is calculated based on a distance from the connected IoT device according to an action that represents an iAP to be connected between candidate iAPs with the IoT device to be connected through numerical analysis of the simulator and the average energy consumption and the average latency, and minimizing the average energy consumption and the average latency of all connected IoT devices is set as the objective function of the EL-RL model.

4. The method of claim 1, wherein the performing, by the iAP controller, reinforcement learning for IoT device energy efficiency and latency using global information that is updated from the local information obtained from the plurality of iAPs comprises performing pretraining using a fingerprinting method of estimating a location of the IoT device by comparing RSSI values input to a fingerprinting map including reference point values prestored in a database in a data collection of an offline process through the location estimation model of the iAP controller.

5. The method of claim 4, wherein the performing, by the iAP controller, reinforcement learning for IoT device energy efficiency and latency using global information that is updated from the local information obtained from the plurality of iAPs comprises collecting RSSI in real time through the IoT device and estimating a location of the IoT device using a model pretrained through the fingerprint method in an online process through the location estimation model of the iAP controller.

6. The method of claim 1, wherein the performing, by the iAP controller, reinforcement learning for IoT device energy efficiency and latency using global information that is updated from the local information obtained from the plurality of iAPs comprises calculating a distance from a candidate iAP according to an estimated location value of the IoT device estimated through the location estimation model of the iAP controller and then calculating a recommended Tx power value of the IoT device through the recommended Tx power model of the iAPcontroller.

7. The method of claim 1, wherein the selecting, by the iAP controller, the optimal iAP based on reinforcement learning and the transmitting the recommended Tx power value information on the IoT device and the probe response message to the selected corresponding iAP comprises:

selecting the optimal iAP through the EL-RL model of the iAP controller using an estimated location value of the IoT device estimated through the location estimation model of the iAP controller and a recommended Tx power value calculated through the recommended Tx power model of the iAP controller; and transmitting the recommended Tx power value information on the IoT device and the probe response message to the selected corresponding iAP to reduce energy consumption in an uplink transmission of the IoT device.

8. The method of claim 1, wherein the transmitting, by the IoT device that receives the probe response message from the optimal iAP, the IoT data at recommended Tx power through the connection process with the optimal iAP comprises numerically analyzing average energy consumption and average latency of the IoT devices using the number of transmission attempts including a retransmission of the IoT device due to a packet collision and a successful transmission probability according to each transmission attempt and transmitting the IoT data at the recommended Tx power according to analysis results, to reduce IoT device energy consumption due to the packet collision that occurs when the IoT device and another IoT device simultaneously transmit a packet during an uplink transmission of the IoT device.

9. The method of claim 8, wherein the transmitting, by the IoT device that receives the probe response message from the optimal iAP, the IoT data at the recommended Tx power through the connection process with the optimal iAP comprises:

calculating the average energy consumption of the IoT devices with a sum of product of probability of all transmission attempts, probability of successful transmission without a packet collision, and an energy consumption value of each transmission attempt; and calculating the average latency of the IoT devices with a sum of product of probability of all transmission attempts, probability of successful transmission without a packet collision, and a latency value of each transmission attempt, and product of a packet collision probability and a time consumed for the packet collision.

10. An access point (AP) connection system using reinforcement learning, the AP connection system comprising:

a plurality of intelligent access points (iAPs) configured to receive a probe request message for iAP connection from an Internet of things (IoT) device present within a multiple iAP coverage area, each of the plurality of iAPs that receives the probe request message transmitting a received signal strength indication (RSSI) value and the probe request message to an iAP controller and periodically transmitting local information that includes the number of IoT devices connected to each iAP to the iAP controller;

the iAP controller configured to perform reinforcement learning for IoT device energy efficiency and latency using global information that is updated from the local information obtained from the plurality of iAPs, to select an optimal iAP based on reinforcement learning, and to transmit recommended Tx power value information on the IoT device and a probe response message to the selected corresponding iAP, the iAP controller including an energy and latency reinforcement learning (EL-RL) model, a location estimation model, and a recommended Tx power model to perform reinforcement learning; and the IoT device configured to receive the probe response message and the recommended Tx power value information from the corresponding iAP that receives its selection as the optimal iAP in response to the probe request, and to transmit IoT data at recommended Tx power through a connection process with the optimal iAP.

11. The AP connection system of claim 10, wherein, to perform reinforcement learning for IoT device energy efficiency and latency using global information that is updated from the local information obtained from the plurality of iAPs, the iAP controller is configured to numerically analyze average energy consumption and average latency of the IoT devices according to the number of uplink transmission attempts of the IoT device and a successful transmission probability according to each transmission attempt through the EL-RL model of the iAP controller and to perform reinforcement learning with a policy that minimizes an objective function configured with a weighted sum of the average energy consumption and the average latency of the IoT devices according to analysis results.

12. The AP connection system of claim 11, wherein the iAP controller is configured to transmit a state to an EL-RL agent of the EL-RL model for optimal iAP selection in an environment of a simulator for performing reinforcement learning through the EL-RL model, and the state is set based on an RSSI value between an IoT device to be connected and a candidate iAP and the number of IoT devices connected to the iAP, a reward is calculated based on a distance from the connected IoT device according to an action that represents an iAP to be connected between candidate iAPs with the IoT device to be connected through numerical analysis of the simulator and the average energy consumption and the average latency, and minimizing the average energy consumption and the average latency of all connected IoT devices is set as the objective function of the EL-RL model.

13. The AP connection system of claim 10, wherein, to perform reinforcement learning for IoT device energy efficiency and latency using global information that is updated from the local information obtained from the plurality of iAPs, the iAP controller is configured to perform pretraining using a fingerprinting method of estimating a location of the IoT device by comparing RSSI values input to a fingerprinting map including reference point values prestored in a database in a data collection of an offline process through the location estimation model of the iAP controller.

14. The AP connection system of claim 13, wherein the iAP controller is configured to collect RSSI in real time through the IoT device and to estimate a location of the IoT device using a model pretrained through the fingerprint method in an online process through the location estimation model of the iAP controller.

15. The AP connection system of claim 10, wherein, to perform reinforcement learning for IoT device energy efficiency and latency using global information that is updated from the local information obtained from the plurality of iAPs, the iAP controller is configured to calculate a distance from a candidate iAP according to an estimated location value of the IoT device estimated through the location estimation model of the iAP controller and then calculate a recommended Tx power value of the IoT device through the recommended Tx power model of the iAP controller.

16. The AP connection system of claim 10, wherein, to select the optimal iAP based on reinforcement learning and to transmit the recommended Tx power value information on the IoT device and the probe response message to the selected corresponding iAP, the iAP controller is configured to, select the optimal iAP through the EL-RL model of the iAP controller using an estimated location value of the IoT device estimated through the location estimation model of the iAP controller and a recommended Tx power value calculated through the recommended Tx power model of the iAP controller, and transmit the recommended Tx power value information on the IoT device and the probe response message to the selected corresponding iAP to reduce energy consumption in an uplink transmission of the IoT device.

17. The AP connection system of claim 10, wherein, to transmit the IoT data at the recommended Tx power through the connection process with the optimal iAP when the probe response message is received from the optimal iAP, the IoT device is configured to numerically analyze average energy consumption and average latency of the IoT devices using the number of transmission attempts including a retransmission of the IoT device due to a packet collision and a successful transmission probability according to each transmission attempt and to transmit the IoT data at the recommended Tx power according to analysis results, to reduce IoT device energy consumption due to the packet collision that occurs when the IoT device and another IoT device simultaneously transmit a packet during an uplink transmission of the IoT device.

18. The AP connection system of claim 17, wherein the IoT device is configured to, calculate the average energy consumption of the IoT devices with a sum of product of probability of all transmission attempts, probability of successful transmission without a packet collision, and an energy consumption value of each transmission attempt, and calculate the average latency of the IoT devices with a sum of product of probability of all transmission attempts, probability of successful transmission without a packet collision, and a latency value of each transmission attempt, and product of a packet collision probability and a time consumed for the packet collision.

19. A non-transitory computer-readable recording medium to perform an optimal access point (AP) connection method using reinforcement learning to improve energy efficiency and latency of Internet of things (IoT) devices, the method comprising:

transmitting, by an IoT device present within a multiple intelligent access point (iAP) coverage area, a probe request message for iAP connection to a plurality of iAPs;

transmitting, by each of the plurality of iAPs that receives the probe request message, a received signal strength indication (RSSI) value and the probe request message to an iAP controller and periodically transmitting local information that includes the number of IoT devices connected to each iAP to the iAP controller;

performing, by the iAP controller, reinforcement learning for IoT device energy efficiency and latency using global information that is updated from the local information obtained from the plurality of iAPs, the iAP controller including an energy and latency reinforcement learning (EL-RL) model, a location estimation model, and a recommended Tx power model to perform reinforcement learning;

selecting, by the iAP controller, an optimal iAP based on reinforcement learning and transmitting recommended Tx power value information on the IoT device and the probe response message to the selected corresponding iAP;

transmitting, by the corresponding iAP that receives its selection as the optimal iAP in response to the probe request from the iAP controller, the probe response message and the recommended Tx power value information to the IoT device; and transmitting, by the IoT device that receives the probe response message from the optimal iAP, IoT data at recommended Tx power through a connection process with the optimal iAP.

20. The non-transitory computer-readable recording medium of claim 19, wherein the performing, by the iAP controller, reinforcement learning for IoT device energy efficiency and latency using global information that is updated from the local information obtained from the plurality of iAPs comprises:

numerically analyzing average energy consumption and average latency of the IoT devices according to the number of uplink transmission attempts of the IoT device and a successful transmission probability according to each transmission attempt through the EL-RL model of the iAP controller and performing reinforcement learning with a policy that minimizes an objective function configured with a weighted sum of the average energy consumption and the average latency of the IoT devices according to analysis results;

performing pretraining using a fingerprinting method of estimating a location of the IoT device by comparing RSSI values input to a fingerprinting map including reference point values prestored in a database in a data collection of an offline process through the location estimation model of the iAP controller; and calculating a distance from a candidate iAP according to an estimated location value of the IoT device estimated through the location estimation model of the iAP controller and then calculating a recommended Tx power value of the IoT device through the recommended Tx power model of the iAP controller, and the selecting, by the iAP controller, the optimal iAP based on reinforcement learning and the transmitting the recommended Tx power value information on the IoT device and the probe response message to the selected corresponding iAP comprises:

selecting the optimal iAP through the EL-RL model of the iAP controller using an estimated location value of the IoT device estimated through the location estimation model of the iAP controller and a recommended Tx power value calculated through the recommended Tx power model of the iAP controller; and transmitting the recommended Tx power value information on the IoT device and the probe response message to the selected corresponding iAP to reduce energy consumption in an uplink transmission of the IoT device.

* * * * *